Dec. 8, 1970   F. J. KENT   3,545,240
BILLET FOR EXTRUSION AND METHOD OF LUBRICATING THE SAME
Filed Oct. 25, 1966   2 Sheets-Sheet 1
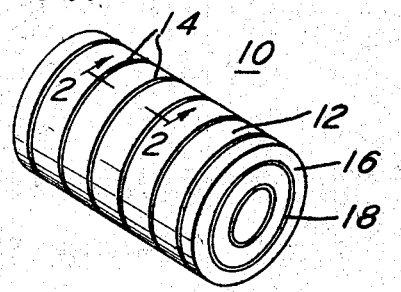
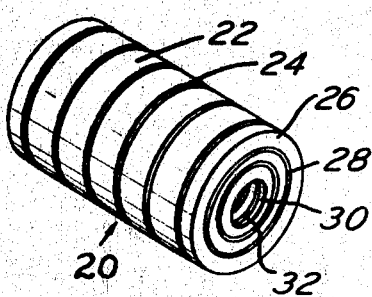
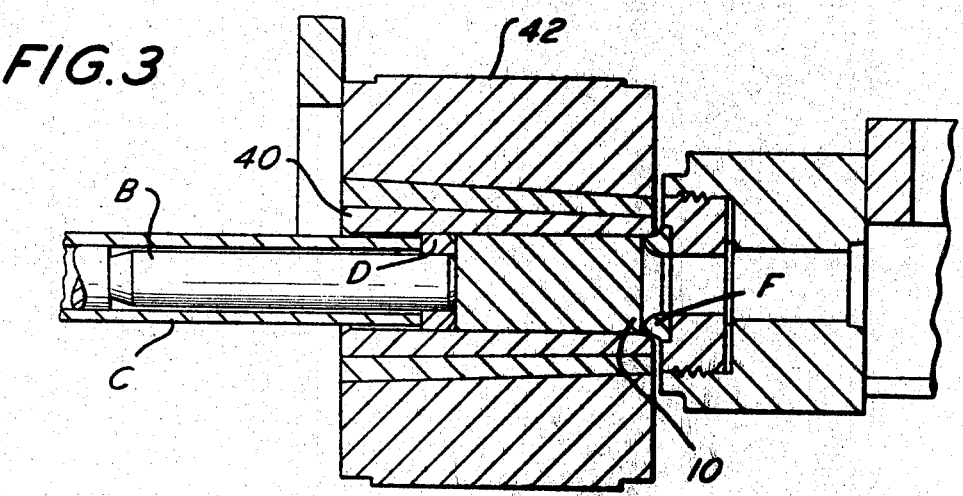
INVENTOR.
FRANCIS J. KENT
BY Seidel & Gonda
ATTORNEYS.

Dec. 8, 1970   F. J. KENT   3,545,240
BILLET FOR EXTRUSION AND METHOD OF LUBRICATING THE SAME
Filed Oct. 25, 1966   2 Sheets-Sheet 2

INVENTOR.
FRANCIS J. KENT
ATTORNEYS.

United States Patent Office 3,545,240
Patented Dec. 8, 1970

3,545,240
BILLET FOR EXTRUSION AND METHOD OF LUBRICATING THE SAME
Francis J. Kent, Wallingford, Pa., assignor to Baldwin-Lima-Hamilton Corporation, Philadelphia, Pa., a corporation of Delaware
Filed Oct. 25, 1966, Ser. No. 589,443
Int. Cl. B21c 23/32
U.S. Cl. 72—41                                     3 Claims

ABSTRACT OF THE DISCLOSURE

A metal billet for extrusion is provided within a plurality of circumferential and, if desired, also longitudinal grooves extending about the periphery of the billet. The grooves are adapted to receive a lubricant to provide lubrication during the extrusion process. The lubricant is maintained within the grooves to provide continuous lubrication of the die where it is needed most. Lubrication is also provided for the liner walls. The billet may be provided with grooves on the end face thereof which contacts the die. Also, wherein a billet is normally formed with an axial hole in the center thereof, grooves may be provided within the billet hole, and provided with lubricant to control the friction on the mandril during extrusion.

---

In general, this invention relates to a new and improved billet and a method of lubricating the billet for extrusion purposes. More particularly, the present invention relates to a method of lubricating a metal billet with any lubricant during extrusion which does not require changes in the extruding apparatus.

In the past, certain difficulties have arisen regarding the extrusion of metal such as carbon steel, stainless steel, special steel, nickel, Monel, Inconel, etc., due to the high temperatures of the heat of the billet, heat generated by friction at the extruding die and the heat of deformation. With more ductile metals such as aluminum and copper, this problem was not as pronounced due to the lower extrusion temperatures involved in billets of these materials. Extrusion lubricants have been developed for lowering the friction between the billet and the die and liner of the extruder. Such lubricants might be tallow and graphite, or molybdenum disulfide with tallow, or various other substances. The lubricant was applied by swabbing the liner of the extruder chamber before placing the billet in the chamber and/or swabbing the lubricant over the surface of the billet. However, as soon as the billet was put under pressure and moved forward, the lubricant was removed from the surface of the billet and, therefore, did not perform its function.

In order to avoid this, in recent years, the billets have been wrapped in fiber glass sheets before being placed in the extrusion cylinder. The fiber glass would melt under the extreme temperatures forming liquid glass which is an excellent lubricant as it does not react with either the metal being extruded or the metal forming the die and liner of the extruder. However, after the billet had been extruded, the fiber glass cooled and solidified on the die of the extruder, therefore requiring workers to chip off the now-crystalline glass from the die and the liner. It also solidified on the extruded rod or tube, requiring pickling, shotblasting or other cleaning methods. When using such sheets of fiber glass, the billet is slightly smaller in diameter than it normally would be.

From a study of the past methods of applying a lubricant between the billet and the liner of the extruder chamber and the die of the extruder, it has been found that certain criteria must be met. First, the lubricant must be evenly distributed around the circumference of the billet in order to prevent an uneven friction condition from occurring between the billet and the billet container which might easily affect the metal distribution quality in the resulting extrusion. This is particularly important in the extrusion of tubular shapes having relatively thin walls. Further, the method of applying the lubricant must be adaptable to extruding apparatus now in use so that no costly replacement of existing equipment need be made. Further, the method itself should be simple to practice and capable of being utilized with billets of all shapes and sizes.

Therefore, it is the general object of this invention to avoid and overcome the foregoing and other difficulties of the prior art practices and to conform to the criteria mentioned above by the provision of a new and better billet for extruding and a method of lubricating the same.

Another object of the present invention is the provision of a new and better method of lubricating billets which will provide a uniform distribution of lubricant around the circumference of the billet.

Still another object of this invention is the utilization of a new and better billet for extrusion purposes which is provided with circumferential grooves for retaining lubricant during the extruding process.

A further object of this invention is the provision of a new and better method of lubricating a billet to control the friction on the extruder mandrel utilized with a billet having an axial hole therethrough in the production of tubing.

Other objects will appear hereinafter.

The present invention contemplates the provision of a metal billet for extrusion having a plurality of circumferential and, if desired, also longitudinal grooves extending about the periphery of the billet. By swabbing the container liner or the grooved billet in the manner previously utilized for smooth surface billets, the lubrication of the billet during extruding has been measurably increased. Billets of the type herein involved must be heated to high temperatures in order to be in proper condition for extruding. When conventional lubricants other than glass are applied to the peripheral surface of the heated billets they may be ignited due to the high temperature of the billet. The lubricants may be burned off prior to insertion of the billet into the extrusion apparatus. This problem may be circumvented by swabbing or spraying the liner of the extrusion apparatus with a relatively heavy coating of lubricant. As the billet is inserted into the liner the lubricant will be received in the grooves of the billet and will not ignite and burn off due to the lack of oxygen in the extrusion apparatus.

The lubricant will be maintained within the grooves and will not be removed from the surface of the billet when it is upset in the billet container of the extruder. It will be carried along with the billet and provide continuous lubrication of the die where it is needed most. As an optional feature, the invention further contemplates the provision of grooves on the front surface of the billet essentially in the circumferential direction for retaining lubrication when the front portion of the billet comes into contact with the die of the extruder. Alternatively, if burning off of the lubricant is encountered when applied to the front portion of the billet, the die which the billet is to contact can have the lubricant applied thereto. When the billet initially contacts the die, the lubricant will be received within the grooves on the front surface of the billet. Lack of oxygen within the extrusion apparatus will prevent the lubricant from burning when it contacts the front face of the billet.

Still further, in the case of tubular extrusions, where the billet is normally formed with an axial hole in the center, lubrication grooves can be provided in the shape of individual circular grooves, a continuous spiral groove, or longitudinal grooves in the billet hole to control the friction on the mandrel during extrusion.

The lubrication of the billet in the manner taught by the present invention increases the effective life of the liner, the die, and the mandrel because they are more effectively protected against friction erosion and heat which are the prime reasons for shortening the useful life of these parts. It also contributes to obtaining a better surface of the extrusion which is detrimentally affected by friction and by the wear of the die and liner surface.

While the invention is applicable to billets of varying sizes, it is particularly adapted to be used by billets which are generally from 10–50 inches long and are 2–10 inches in diameter.

For the purpose of illustrating the invention, there are shown in the drawings forms which are presently preferred; it being understood, however, that this invention is not limited to the precise arrangements and instrumentalities shown.

FIG. 1 is a perspective view of a billet manufactured in accordance with the principles of the present invention.

FIG. 2 is an enlarged view of a portion of the billet shown in FIG. 1.

FIG. 3 is a schematic showing of extruding apparatus utilizing the billet of FIGS. 1 and 2 to form an extruded tube.

FIG. 4 is a perspective view of a second embodiment of the present invention.

Figure 5:
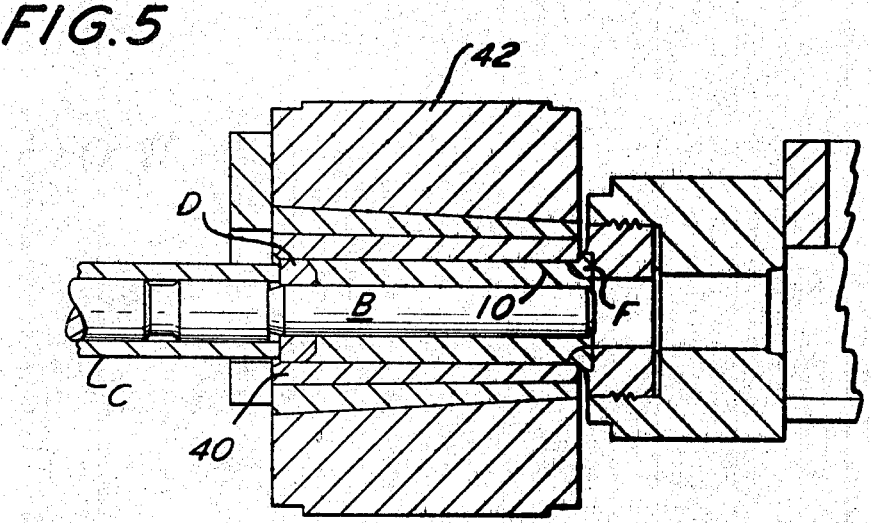
FIG. 5 is a schematic showing of the apparatus of FIG. 3 after the third step in extruding the billet into a tube.

In FIG. 1, there is shown a cylindrical billet generally designated by the numeral 10. It shall be understood for purposes of this discussion that although a cylindrical billet is more readily adapted for use with the principles of the present invention, any other billet shape could also utilize these principles.

The cylindrical billet 10 has an outer peripheral surface 12 on which are circumscribed substantially parallel circumferential grooves 14. Other types of groove patterns such as a criss-cross, spiral pattern or longitudinal could be used. The grooves 14 encircle the billet but do not extend any appreciable distance into the billet so as not to affect the resultant extruded product. The circumferential grooves 14 can be placed on the surface 12 while the billet is hot by causing it to roll over a plurality of upstanding blades, or by an operation similar to thread rolling, or by milling or cutting the grooves from a cold billet.

The front surface 16 of the billet 10 also may have provided a plurality of grooves 18 therein extending a substantially circumferential direction which can be placed thereon by any suitable means.

In practicing the present invention, the liner of the extruder chamber would be swabbed with a lubricant such as graphite and tallow or molybdenum disulfide and tallow, or any other suitable lubricant, with the same lubricant being swabbed on the billet 10, if desired. The extruder chamber forms a billet container 42 into which the billet 10 is placed. Instead of the lubricant being removed by movement of the billet 10 within the liner 40 of the billet container 42, the lubricant is retained in the circumferential grooves 14 and the grooves 18 on the front surface of the billet 10 so that the die F and the liner 40 are fully lubricated during the extruding process so as to limit the wear thereon.

In FIG. 3, there is shown a schematic view of an extruding apparatus utilized with the cylindrical billet 10. The billet 10 has been swabbed with a lubricant. A lubricant has also been applied to the linear 40 of the extruder container 42. The heated billet 10 is pushed into the container 42 of the extruder by means of a mandrel B, tubular stem C, and a dummy block D.

As shown in FIG. 5, a hole is pierced in the billet 10 by mandrel B. The lubricating material in the circumferential grooves 14 insures adequate lubrication between the billet and the container liner 40. Additionally, the grooves 18 in the front surface aid in lubricating the interface between the billet 10 and the die F.

Figure 6:
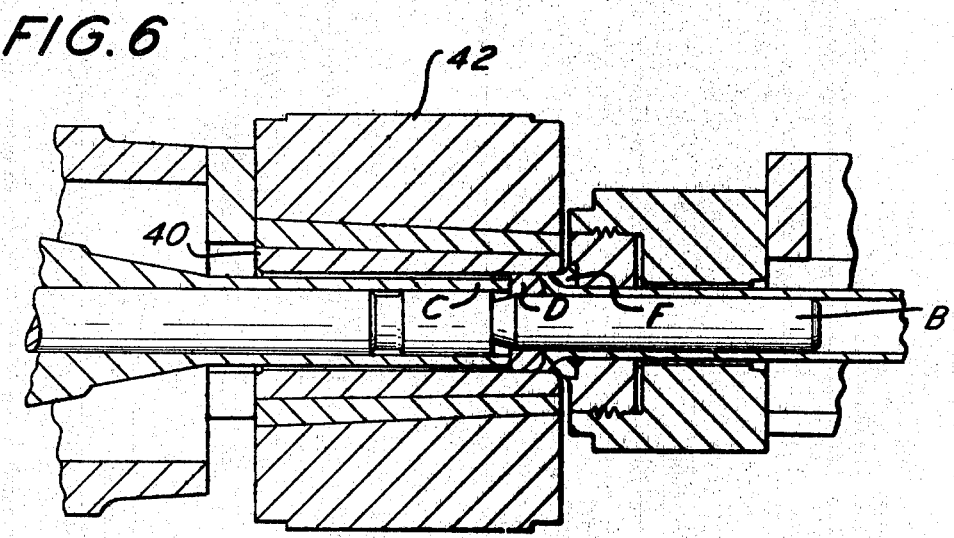
FIG. 6 is a schematic showing of the final step in extruding a billet into a tube.

In the final step, the billet 10 is extruded into a tube as stem C pushes dummy block D forward from the position illustrated in FIG. 6. The mandrel B generally travels at the same speed as stem C as the tube forms therearound. However, mandrel B and stem C may move forward at different speeds. It should be noted that the circumferential grooves carry the lubricant therein to the die F so that adequate lubrication is achieved.

The billet may be of the type shown in FIG. 4. In FIG. 4, there is shown a second billet 20 having an axial hole 30 therethrough which is drilled, pre-pierced or cast so that the extruder mandrel forming the inside diameter of the extruded tube can extend through the billet into exact position relative to the orifice which forms the outside diameter of the extruded tube.

The billet 20 has formed on its outer peripheral surface 22 a plurality of substantially circumferential grooves 24 for the reasons discussed previously. Also, on the front surface 26 of the billet 20, there may be provided a plurality of grooves 28 running in a substantially circumferential direction which will also be useful in retaining lubricant during the extruding process. Still further, the interior of the axial hole 30 has a continuous spiral groove 32 cut therein. An alternative to the continuous spiral groove 32 would be a plurality of spaced parallel circular grooves such as the grooves 24 on the outer surface 22 of the billet 20. However, it is easier to place a spiral groove in the axial hole by means of a rotating screw-type cutter than to place a plurality of parallel circular grooves. If desired, the grooves on the outer periphery of the billets may be spiral.

By swabbing the outer surface 24 and the inner surface 30 of the billet 20 with a lubricant, it is possible to insure the placement of lubricant in the grooves 24, 28 and 32. Thus, friction will be lessened on the mandrel B, the billet container liner 40, and the die F, so as to effectively increase their useful life.

If it proves too costly for a manufacturer to provide the spiral grooves 32 in the axial hole 30, they can be eliminated as the mandrel develops the least friction during the extruding process. The die F of the extruder would normally develop the most friction as it is the portion of the extruder which does the work required in reducing the billet to a tube.

The depth of the grooves may vary. I have found that the preferred depth of grooves is between about .25% and 1% of the diameter of the billet. For example, on a billet having a diameter of 6 inches, grooves about .030 inch are satisfactory. This invention may be used on billets of varying sizes and is particularly adapted to be used on billets which are generally 10–50 inches long and generally 2–10 inches in diameter.

The present invention may be embodied in other specific forms without departing from the spirit or essential attributes thereof and, accordingly, reference should be made to the appended claims rather than to the foregoing specification as indicating the scope of the invention.

I claim:
1. A method of forward hot extrusion comprising the steps of providing a billet, forming at least one channel extending around the entire circumference of the billet, providing the channel with the depth of approximately .25 to 1 percent of the diameter of the billet, heating the billet, providing an extrusion cylinder, providing a liner in the extrusion cylinder, uniformly distributing an extrusion lubricant in the liner of the extrusion cylinder, inserting the billet into the liner, distributing the extrusion lubricant into the channel of the billet, providing an extrusion die to be used in forming a desired metal object, providing extrusion lubricant in sufficient quantity to provide adequate lubricant for the die during extrusion of the billet, forcing the billet through the extrusion die to form an extruded metal object, and lubricating the die during the extrusion by the lubricant trapped in the channels of the billet.

2. The method as set forth in claim 1 wherein the step of forming at least one channel extending around the entire circumference of the billet includes providing a continuing helical channel about the outer surface of the billet, forming channels on the front surface of the billet extending in a circumferential direction, distributing a lubricant medium to the front surface channels of the billet before the extruding step, providing the billet with an axial hole therethrough, forming lubrication channels on the inner surface of the billet defined by the axial hole therethrough, in distributing lubricating medium on the inner surface and in the inner surface channels.

3. Method as set forth in claim 1 wherein the step of forming at least one channel extending around the entire circumference of the billet includes forming spaced individual parallel circular panels each of which extends around the outer periphery of the billet, forming spaced circular parallel channels on the front surface of the billet extending in a circumferential direction.

References Cited

UNITED STATES PATENTS

| | | | |
|---|---|---|---|
| 2,005,175 | 6/1935 | Adams | 29—183 |
| 2,971,644 | 2/1961 | Sejournet | 72—43 |
| 3,015,154 | 1/1962 | Evans | 29—183 |
| 3,100,930 | 8/1963 | Nihlen et al. | 72—253 |
| 3,172,536 | 3/1965 | Cairns | 72—43 |
| 1,600,961 | 9/1926 | Payne | 29—149.5 |
| 1,923,514 | 8/1933 | Stockfleth | 29—149.5 |
| 2,164,902 | 7/1939 | Coleman | 29—149.5 |
| 2,572,021 | 10/1951 | Folz | 29—149.5 |

FOREIGN PATENTS 621,535  4/1949  Great Britain.

CHARLES W. LANHAM, Primary Examiner

E. M. COMBS, Assistant Examiner